Nov. 28, 1961  J. M. GUTHRIE ET AL  3,010,677
MISSILE CONTROL SYSTEM
Filed Nov. 12, 1957  4 Sheets-Sheet 1

INVENTORS
JOHN M. GUTHRIE, CASIMIR J. BONK,
CLARK E. ALLARDT, GLEN W. ASHLEY, JR.,
GEORGE E. BURKHEIMER, DONALD I. SMITH
BY
*Walter J. Jason*
ATTORNEY Nov. 28, 1961    J. M. GUTHRIE ET AL    3,010,677
MISSILE CONTROL SYSTEM
Filed Nov. 12, 1957    4 Sheets-Sheet 2
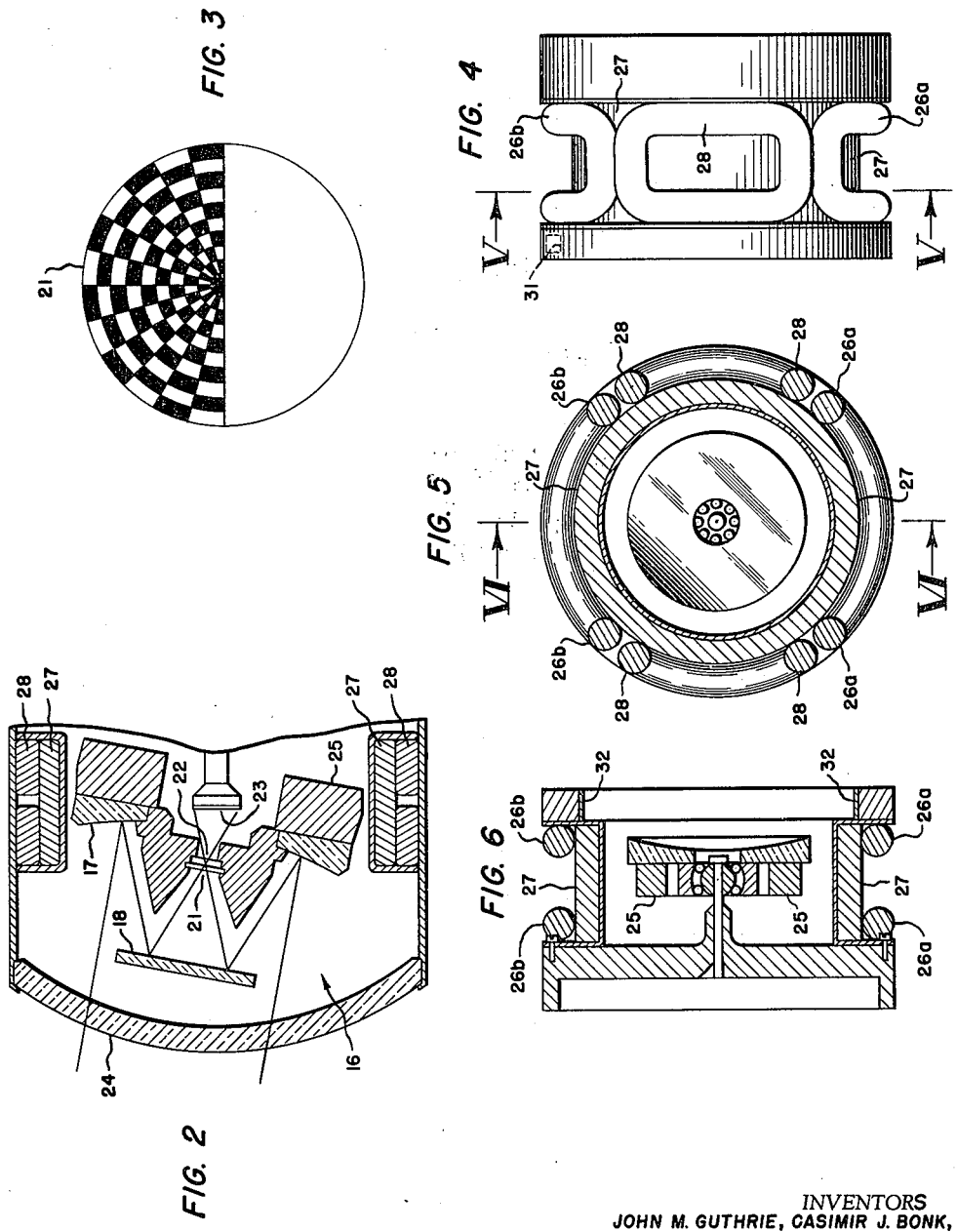
INVENTORS
JOHN M. GUTHRIE, CASIMIR J. BONK,
CLARK E. ALLARDT, GLEN W. ASHLEY, JR.,
GEORGE E. BURKHEIMER, DONALD I. SMITH
BY
ATTORNEY

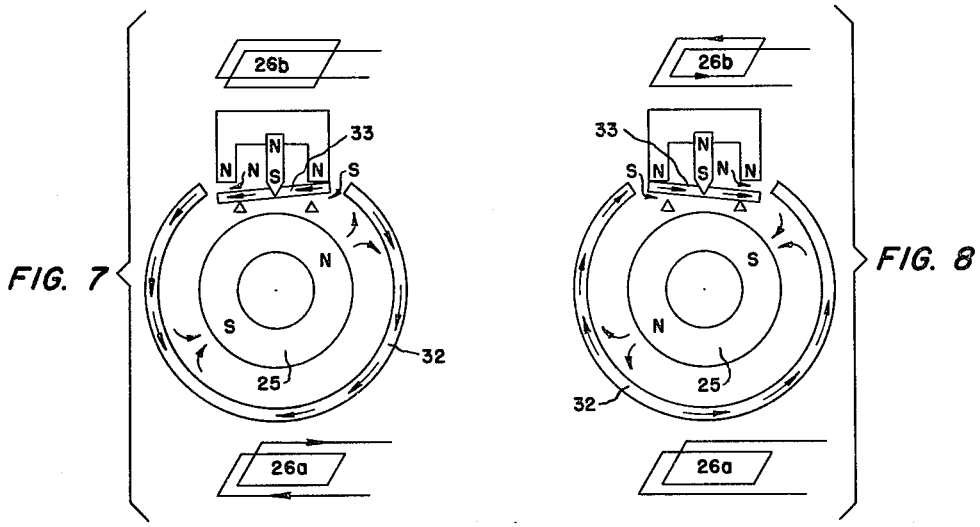
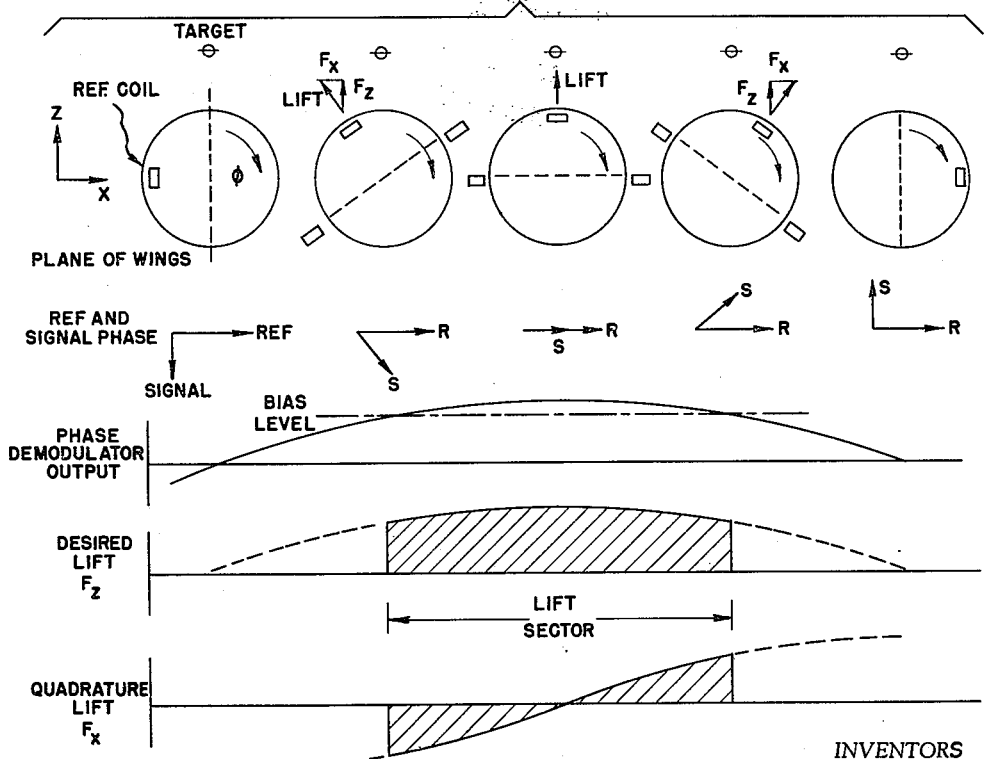

Nov. 28, 1961   J. M. GUTHRIE ET AL   3,010,677
MISSILE CONTROL SYSTEM
Filed Nov. 12, 1957   4 Sheets-Sheet 4

INVENTORS
JOHN M. GUTHRIE, CASIMIR J. BONK,
CLARK E. ALLARDT, GLEN W. ASHLEY, JR.,
GEORGE E. BURKHEIMER, DONALD I. SMITH
BY
Walter J. Jason
ATTORNEY

2

United States Patent Office 3,010,677
Patented Nov. 28, 1961

3,010,677
MISSILE CONTROL SYSTEM
John M. Guthrie, Pomona, Casimir J. Bonk, Claremont, Clark E. Aliardt and Glen W. Ashley, Jr., Pomona, George E. Burkheimer, Covina, and Donald I. Smith, La Mesa, California, assignors to General Dynamics Corporation, Convair Division, San Diego, Calif., a corporation of Delaware
Filed Nov. 12, 1957, Ser. No. 696,589
12 Claims. (Cl. 244—14)

The present invention relates to a missile control system, and more particularly to a control system utilizing a pair of fixed incidence aerodynamic control surfaces which are rapidly extended into and retracted from the airstream.

This control system is unusual in that it uses retractable control surfaces where other missiles use control surfaces that remain in the airstream. Only two control surfaces are used instead of the four usually necessary in a missile which maneuvers in three dimensions. The number of control surfaces required is reduced by utilizing the missile roll to achieve control in any direction. These novel features permit a simpler and lighter control system. The simplicity of the system increases a missile's reliability.

The preferred embodiment of this control system utilizes an optical infrared-homing head which senses the direction of flight path error in polar coordinates. A hot gas servo extends the control surfaces during the proper portion of each missile revolution to correct the error.

An object of the present invention is to provide a more compact and comparatively small missile control system.

Another object is to provide a more simple and thus more reliable missile control system.

Other objects and features of the present invention will be readily apparent to those skilled in the art from the following specification and appended drawings wherein is illustrated a preferred form of the invention, and in which:

FIGURE 2 is a schematic illustrating seeker head operation.

FIGURE 3 shows the reticle used in the seeker head.

FIGURE 4 is a simplified diagram of the spin motor coils and reference coils.

FIGURE 5 is a cross section of FIGURE 4 taken along line V—V.

FIGURE 6 is a cross section of FIGURE 5 taken along line VI—VI of FIGURE 5.

FIGURE 7 illustrates one phase of magnetic switch operation.

FIGURE 8 illustrates another phase of magnetic switch operation.

FIGURE 9 shows how normal acceleration is controlled.

To facilitate the description and explanation of operation of this invention it will be treated in the environment for which it is intended, i.e., a missile.

Figure 1:
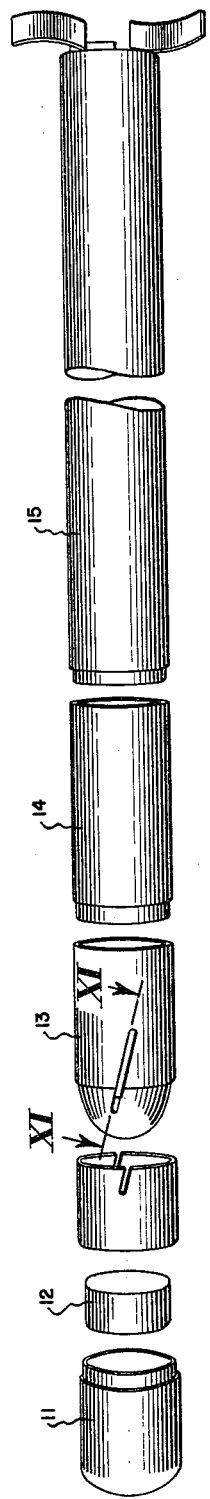
FIGURE 1 is an exploded elevational view of a missile utilizing the control system described herein.

The missile shown in FIGURE 1 is exploded to show the seeker head 11, packaged electronics section 12, hot gas control section 13, warhead 14, and motor 15. The preferred seeker head 11 is further illustrated in FIGURE 2. It is a free gyro stabilized heat sensing mechanism. The function of this seeker is to provide a measurement of angular rate of the missile-to-target line of sight. The entire optical unit 16 is a part of the rotating gyro mass or rotor. The optical portion of the head is a Cassegrain telescope but other types of telescopes could be used. An obvious alternate is the Gregorian telescope. As shown in FIGURE 2, incident energy is reflected by the gyro-mounted primary mirror 17 onto a secondary mirror 18 and focused onto a spinning reticle or chopper 21. Light passing through the reticle is filtered by a filter 22 and falls on a cell 23 which converts heat energy pulses to electrical pulses. The cell is stationary and does not rotate with the telescope. The cell responds best to a particular range of wavelengths of incident energy. The missile dome 24 and filter 22 must be transparent in this region and the coatings applied to the primary and secondary mirrors must be highly reflective here.

The reticle serves two functions in an infrared seeker: It provides discrimination against certain unwanted "targets" such as cloud edges and it permits sensing of tracking error by chopping the radiation passing to the sensitive cell. The reticle is illustrated in FIGURE 3.

FIGURE 4 shows the motor coils 26a and 26b which are used to spin the gyro, and precession coils 27 which are used to precess the gyro. Pickoff or reference coils 28 are used to sense gyro position. A magnetic switch 31 is provided to alternately energize the two motor field coils 26a and 26b which are placed diametrically opposite each other. FIGURE 5 clarifies the relative positions of the precession coils 27, reference coils 28, and motor coils 26a and 26b. FIGURE 6 is a simplified diagramed cross-section of the rotating gyro. A portion of the gyro is a magnet 25 polarized in the plane of rotation. A mu-metal ring 32 picks up flux from the magnet and carries it to the magnetic switch 31 which is indicated in FIGURE 4.

FIGURES 7 and 8 illustrate the operation of the magnetic switch. In FIGURE 7, flux collected by the ring 32 flows through the armature 33 in a direction to aid the normal armature-to-pole gap flux at the right hand side of the armature, and to oppose the normal armature-to-pole gap flux at the left hand side, resulting in an unbalance of gap forces and closing the right hand gap. This closes the left hand contact, which causes current to flow in coil 26a, repelling the south pole of the rotor and attracting the north pole, and resulting in clockwise rotation of the rotor. As soon as the poles have reversed their position, as shown in FIGURE 8, the flux reverses its direction through the armature, causing current to flow in 26b, resulting in a continuance of the clockwise rotation of the rotor. The position of the switch is approximately 10 degrees in advance of the motor coil centerline to compensate for the inertia time constant of the switch armature. The rotor magnet pole phasing relative to the reticle of the optical system is approximately 30 degrees counterclockwise from the reticle spoke section start, with clockwise rotation of the rotor.

Flight control of the missile is accomplished by means of a set of fixed-angle, retractable wings housed in section 13 shown in FIGURE 1. The missile must roll continuously for these wings to have effect. This roll may be established by various methods. One such method is the use of canted rocket nozzles while another method is the use of canted tail fins.

In the preferred embodiment disclosed herein, the reticle or chopper spins at approximately 70 c.p.s. with respect to the airframe, generating a 70 c.p.s. voltage in the reference coil. Since the airframe rotates at a roll rate $\dot{\phi}$, the reticle also produces a target-error signal at a frequency of $(70+\dot{\phi})$ c.p.s. These two signals (target-error and reference) are compared in a phase demodulator, which produces a sinusoidal signal of frequency $\dot{\phi}$ and phase $\phi$, as shown in FIGURE 9.

The wing servo is adjusted to extend the wings whenever the demodulator voltage exceeds a particular bias voltage, as shown. Consequently, the wings are extended for a portion of each roll cycle; the center of the extension periods coincides with the desired direction of lift, and the width of the period is a function of the error signal magnitude. This wing extended time is called the "lift sector." The desired-direction lift and quadrature lift which result are also shown in FIGURE 9.

Actually, the lift force generated by the wings is only a fraction of the required lift force. The remainder of the force is provided by the fuselage. Since body angle of attack lags behind wing force in time, the reference coil must be rotated through a lag angle with respect to the wings. This lag angle is such that the net lift force (wing plus body) is in the direction of the target.

The electronics system, a portion of which forms the electronics section 12 shown in FIGURE 1, utilizes transistors to keep power requirements and packaging volume at a minimum. The block diagram, FIGURE 10, of the electronics system shows what portion of the electronics resides in the seeker head. In the invention disclosed herein, an external battery, connected to the missile through a quick disconnect plug, is used to spin the gyro up to its proper speed. This external battery reduces weight in the missile and leaves more room for the other missile components.

Figure 10:
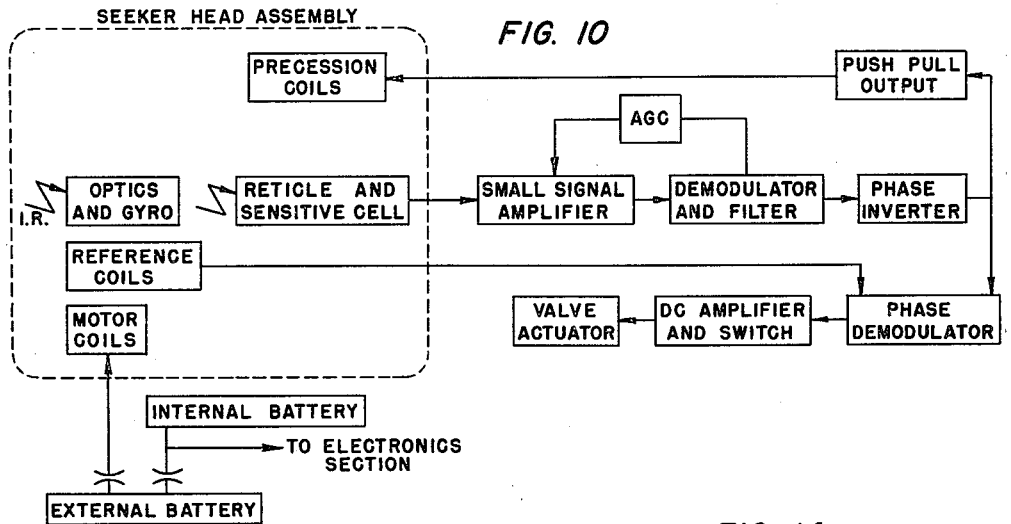
FIGURE 10 is a block diagram of the missile electronics.

The automatic gain control shown in FIGURE 10 is used since the output from the sensitive cell varies throughout a wide range and, as a result, the gain of the small signal amplifier must be varied to avoid excessive distortion and to improve the signal-to-noise ratio. The actual circuitry corresponding to the block diagram is conventional and within the scope of one skilled in the art.

Figure 11:
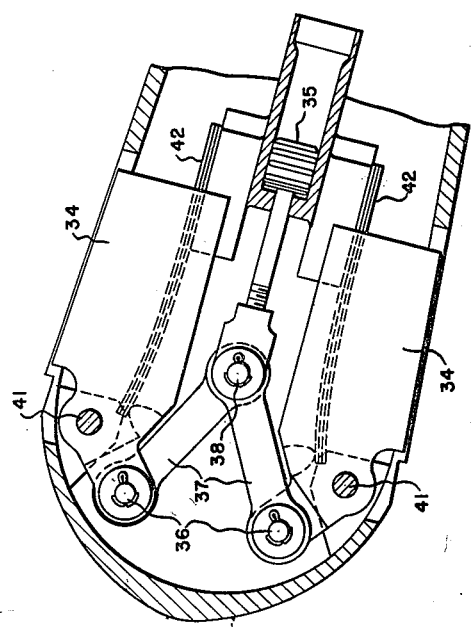
FIGURE 11 is a cross section of the hot gas control section taken along line IX—IX of FIGURE 1.

The control servo is a hot gas servo which is single acting and spring returned. FIGURE 11 is a cross section showing the control wings 34 linked to the hot gas piston or actuator 35. The linkage consists of the pins 36, rods 37, and pin 38. The wings pivot about pins 41 and are extended when the piston moves rearward. When piston gas pressure is removed the flat or leaf springs 42 and aerodynamic forces return the wings to their closed position.

Figure 12:
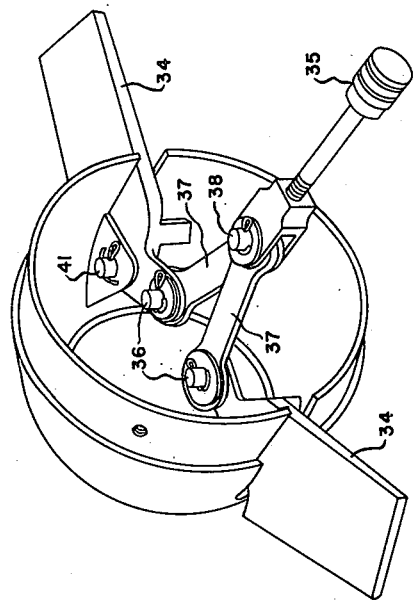
FIGURE 12 is a perspective view of a portion of the hot gas control section showing the control wings extended.

FIGURE 12 shows extended wings, linkage, and piston in a perspective view of a portion of the hot gas control section 13 shown in FIGURE 1.

Figures 13, 14:
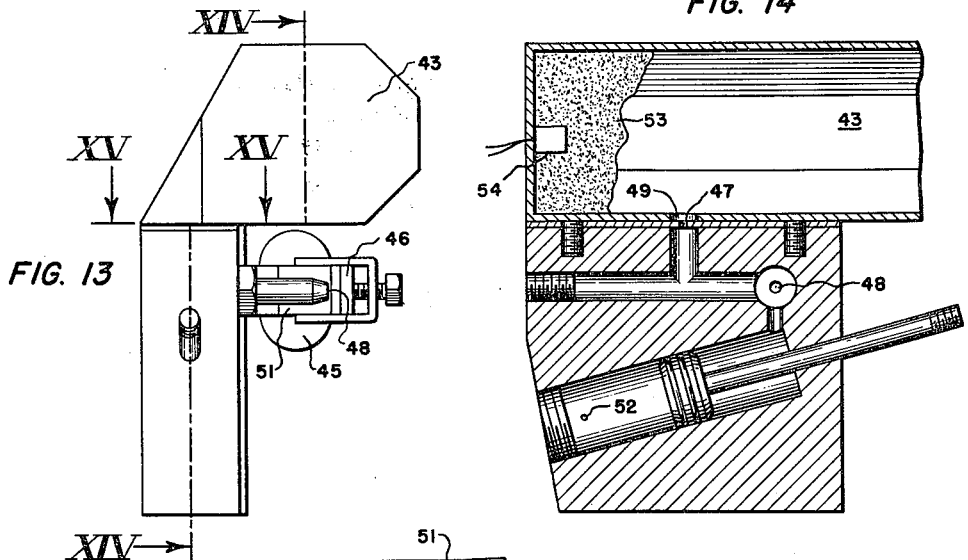
FIGURE 13 shows the hot gas generator, the piston chamber, and the valve coil and clapper.
FIGURE 14 is a cross section taken along line XIV—VIX of FIGURE 13.
Figure 15:
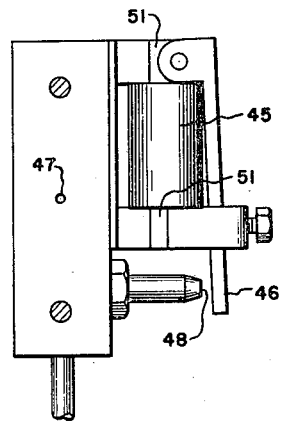
FIGURE 15 is a cross section taken along line XV—XV of FIGURE 13.

FIGURES 13 and 14 show the gas generator 43 which is used to produce the gas pressure. A stick of solid propellant 53 is used in the generator and is ignited by a conventional squib-type ignitor 54 at the desired time. Ignition of the generator propellant produces the hot gas necessary for the actuating of the control surfaces. In the preferred embodiment the generator is ignited at missile launching. In a normal missile, the control surfaces will have cleared the launching apparatus in the time that is required for gas pressure buildup in the system. As shown in FIGURE 14, a passage 49 and orifice 47 admit gas to the piston head and control orifice 48. A clapper 46 shown in FIGURE 13 is used to close and open the orifice 48. A conventional coil 45 and magnet 51 are used to move the clapper. These are shown in FIGURES 13 and 15. When the coil is energized, the clapper closes the orifice 48 and gas pressure is applied to the piston, forcing it to the rear. An orifice 52 is provided to prevent a pressure buildup on the rear side of the piston. When the clapper is removed from the orifice 48, the gas pressure is relieved and the flat springs 42 shown in FIGURE 11 cooperate with aerodynamic forces to return the wings to their closed position.

While there are various ways in which this missile control system can be used, the following mode of operation is preferred: The external battery is used to spin the gyro head up to required speed and the missile is pointed toward the target. The seeker head acquires the target and the sensitive cell produces electrical impulses called an error signal.

The small signal amplifier amplifies the error signal. The output of the amplifier is connected to and is made audible in a speaker and notifies an operator that the target has been acquired. Other methods of notifying the operator of target acquisition are acceptable. The error signal is then filtered to the desired bandwidth, demodulated, inverted in phase and transmitted to a phase demodulator and a precession coil preamplifier having a push-pull output. The precession coils produce a magnetic inductance field in accordance with the signal received from the pre-amplifier. This field produces a torque on the rotating magnet causing the seeker head to more accurately orient itself with the target.

The rotating magnet also induces a voltage in the reference coils. This reference voltage is compared with the error signal in the phase demodulator. The output of the phase demodulator is amplified and fed to the valve coil which controls the movement of the clapper and thus the movement of the piston and control wings.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What we claim is:

1. A control system adapted to effect flight control of a rolling missile, said control system comprising a target seeker head having means for generating electrical signals in accordance with the relative positions of the missile and target, two lift producing control wings extendable into and retractable from the missile's airstream, an actuator engaged with said control wings and operable to move said wings in response to electrical control signals, electronic means connected between said seeker head and said actuator to receive the electrical signals from the seeker head and transform them into wing actuator control signals and seeker head control signals whereby the wings are extended during that portion of the missile's roll necessary to keep the missile on a target intercept course and the seeker head is continuously oriented with the target.

2. A control system adapted to effect flight control of a rolling missile, said control system comprising a target seeker head having means for generating electrical signals in accordance with the relative positions of the missile and target and means for orienting said seeker with the target, two fixed incidence lift producing control wings extendable into and retractable from the missile's airstream, an actuator engaged with said control wings and operable to exend said wings when energized by electrical control signals, means engaged with said wings for retracting said wings when said actuator is de-energized, electronic means connected to said seeker head and said actuator to receive the electrical signals from the seeker head and transfrom them into wing actuator control signals and seeker head control signals whereby the wings are selectively extended during that portion of the missile's roll necessary to keep the missile on a target intercept course and the seeker head is continuously oriented with the target.

3. A control system adapted to effect flight control of a rolling missile, said control system comprising a target seeker head having means for generating electrical signals in accordance with the relative positions of the missile and target and means for orienting said seeker with the target, two fixed incidence lift producing control wings extendable into and retractable from the missile's airstream, a hot gas actuator engaged with said control wings and operable to extend said wings when energized by electrical control signals, springs engaged with said wings for retracting said wings when said actuator is de-energized, electronic means connected to said seeker head and said actuator to receive the electrical signals from the seeker head and transform them into wing actuator control signals and seeker head control signals whereby the wings are selectively extended during that portion of the missile's roll necessary to keep the missile on a target intercept course and the seeker head is continuously oriented with the target.

4. A control system adapted to effect flight control of a rolling missile, said control system comprising an infrared sensitive target seeker head having means for generating electrical signals in accordance with the relative positions of the missile and target and means for orienting said seeker with the target, two fixed incidence lift producing control wings extendable into and retractable from the missile's airstream, a hot gas actuator engaged with said control wings and operable to extend said wings when energized by electrical control signals, springs engaged with said wings for retracting said wings when said actuator is de-energized, electronic means connected to said seeker head and said actuator to receive the electrical signals from the seeker head and transform them into wing actuator control signals and seeker head control signals whereby the wings are selectively extended during that portion of the missile's roll necessary to keep the missile on a target intercept course and the seeker head is continuously oriented with the target.

5. A control system adapted to effect flight control of a rolling missile, said control system comprising an infrared sensitive target seeker head having means for generating electrical signals in accordance with the relative positions of the missile and target and means for orienting said seeker with the target, two fixed incidence control wings extendable into and retractable from the missile's airstream, a hot gas actuator including a gas generator, a gas pressure motivated piston and electrically responsive means for controlling gas pressure on said piston, linkages connecting the piston of said actuator with said control wings, springs engaged with said wings for retracting said wings, electronic means connected between said seeker head and said actuator to receive the electrical signals from the seeker head and transform them into seeker head control signals and actuator control signals whereby the wings are selectively extended during that portion of the missile's roll necessary to keep the missile on a target intercept course and the seeker head is continuously oriented with the target.

6. A control system adapted to effect flight control of a rolling missile, said control system comprising a target seeker head having reference coils, precession coils, and a heat sensitive cell which produces electrical signals, two control wings extendable into and retractable from the missile's airstream, an actuator engaged with said control wings and operable to move said wings in response to electrical control signals, an electrical signal amplifier connected to said sensitive cell to enlarge signals originating at said cell, a filter connected to the output of said amplifier, a demodulator connected to the output of said filter, a phase inverter connected to the output of said demodulator, a push-pull amplifier connected between said phase inverter and said precession coils, a phase demodulator connected to said phase inverter and to said reference coil, said demodulator producing an output signal in accordance with the two signals, an amplifier connected between said phase demodulator and said actuator to transmit control signals to said actuator whereby the control wings are extended during that portion of the missile's roll necessary to keep the missile on a target intercept course.

7. A control system adapted to effect flight control of a rolling missile, said control system comprising an infrared sensitive target seeker head having means for generating electrical signals in accordance with the relative positions of the missile and target and means for orienting said seeker with the target, two fixed incidence control wings extendable into and retractable from the missile's airstream, a hot gas actuator including a gas generator, a piston chamber connected to said generator, a gas orifice in said chamber wall, a gas pressure motivated piston within said chamber, an electrically controlled valve for opening and closing said orifice and thus releasing pressure from or applying pressure to said piston, linkages connecting the piston of said actuator with said control wings to transform piston motion into wing extension motion, springs engaged with said wings for retracting said wings when gas pressure is released from said piston, electronic means connected between said seeker head and said actuator electrically controlled valve to receive the electrical signals from the seeker head and transform them into seeker head control signals and actuator valve control signals whereby the wings are selectively extended during that portion of the missile's roll necessary to keep the missile on a target intercept course and the seeker head is continuously oriented with the target.

8. A control system adapted to effect flight control of a rolling missile, said control system comprising an infrared sensitive target seeker head, said seeker head including a gyro rotor and motor coils, said gyro rotor having a magnet, infrared energy focusing means, a reticle for chopping a light beam and a filter which will pass only infrared energy, said seeker head including a sensitive cell which converts incident infrared energy into an electrical signal output, a switch connected to a power source and said motor coils to successively energize said motor coils, a reference coil positioned near said magnet and a precession coil positioned near said magnet; electronic means having a phase demodulator connected to receive electrical signals originating at the sensitive cell and the reference coil, said phase demodulator providing an output signal in accordance with the two signals it receives, an electrical circuit connected between the sensitive cell and precession coil to receive signals originating at said sensitive cell and transmit them to said precession coil whereby the gyro rotor is precessed to a position more accurately oriented with the target; said control system comprising two fixed incidence control wings extendable into and retractable from the missile's airstream, a hot gas actuator including a gas generator, a piston chamber connected to said generator, a gas orifice in said chamber wall, a gas pressure motivated piston within said chamber and an electrically controlled valve for opening and closing said orifice and thus releasing pressure from or applying pressure to said piston, said valve being connected to the output of said phase demodulator and controlled thereby, said control system having linkages connecting the piston of said actuator with said control wings to transform piston motion into wing extension motion, springs engaged with said wings for retracting said wings when gas pressure is released from said piston; said seeker head, electronic means, and actuator cooperating to selectively extend said control fins during that portion of the missile's roll necessary to keep the missile on a target intercept course.

9. In a rolling missile flight control system having a target seeker head and electronic means for producing control signals in response to seeker head information, two lift producing control wings extendable into and retractable from the missile's airstream, a control signal responsive actuator engaged with said control wings and operable to move said wings whereby the wings are extended during that portion of the missile's roll necessary to keep the missile on a target intercept course.

10. In a rolling missile flight control system having a target seeker head and electronic means for producing control signals in response to seeker head information, two fixed incidence lift producing control wings extendable into and retractable from the missile's airstream, a control signal responsive actuator engaged with said control wings and operable to move said wings whereby the wings are extended during that portion of the missile's roll necessary to keep the missile on a target intercept course.

11. In a rolling missile flight control system having a target seeker head and electronic means for producing control signals in response to seeker head information, two fixed incidence lift producing control wings extendable into and retractable from the missile's airstream, a control signal responsive actuator engaged with said control wings and operable to extend said wings when energized, means engaged with said wings for retracting said wings when said actuator is de-energized whereby the wings are extended during that portion of the missile's roll necessary to keep the missile on a target intercept course.

12. In a rolling missile flight control system having a target seeker head and electronic means for producing control signals in response to seeker head information, two fixed incidence lift producing control wings extendable into and retractable from the missile's airstream, an electrical control signal responsive hot gas acuator engaged with said control wings and operable to extend said wings when energized by elecrical control signals, springs engaged with said wings for retracting said wings when said actuator is de-energized whereby the wings are extended during that portion of the missile's roll necessary to keep the missile on a target intercept course.

References Cited in the file of this patent

UNITED STATES PATENTS

| 2,421,085 | Rylsky | May 27, 1947 |
| 2,520,433 | Robinson | Aug. 29, 1950 |

FOREIGN PATENTS

| 832,427 | France | July 4, 1938 |